(12) United States Patent
Yuan et al.

(10) Patent No.: US 8,286,132 B2
(45) Date of Patent: Oct. 9, 2012

(54) COMPARING AND MERGING STRUCTURED DOCUMENTS SYNTACTICALLY AND SEMANTICALLY

(75) Inventors: Yu Yuan, Toronto (CA); Scott M Guminy, Newmarket (CA)

(73) Assignee: International Business Machines Corporation, Armonk, NY (US)

(*) Notice: Subject to any disclaimer, the term of this patent is extended or adjusted under 35 U.S.C. 154(b) by 1049 days.

(21) Appl. No.: 12/238,080

(22) Filed: Sep. 25, 2008

(65) Prior Publication Data

US 2010/0088676 A1    Apr. 8, 2010

(51) Int. Cl.
  *G06F 9/44* (2006.01)
(52) U.S. Cl. .................. 717/120; 717/170
(58) Field of Classification Search .............. 717/170, 717/120
  See application file for complete search history.

(56) References Cited

U.S. PATENT DOCUMENTS

| | | | |
|---|---|---|---|
| 6,434,547 B1* | 8/2002 | Mishelevich et al. | 1/1 |
| 7,926,033 B2* | 4/2011 | Gopal et al. | 717/122 |
| 2006/0041579 A1* | 2/2006 | Miyashita et al. | 707/102 |
| 2009/0254971 A1* | 10/2009 | Herz et al. | 726/1 |
| 2010/0077380 A1 | 3/2010 | Baker et al. | |
| 2010/0088676 A1 | 4/2010 | Yuan et al. | |
| 2011/0167154 A1* | 7/2011 | Bush et al. | 709/224 |

OTHER PUBLICATIONS

Office Action—Non-Final for U.S. Appl. No. 12/238,135, filed Sep. 25, 2008; First Named Inventor: Bruce R. Baker; Art Unit: 2192; Mail Date: Jan. 20, 2012.

* cited by examiner

*Primary Examiner* — Li B Zhen
*Assistant Examiner* — Arshia S Kia
(74) *Attorney, Agent, or Firm* — Cantor Colburn LLP; Libby Toub (57) ABSTRACT

A method of performing a three-way merge includes receiving first, second, and third versions of a structured document containing first, second, and third pluralities of elements respectively; deserializing the first, second, and third versions to generate first, second, and third tree-structured data models respectively representing the first, second, and third versions; generating an identifier for each node of each data model that is unique within the data model by applying identifier determination rules to a context describing the element corresponding to the node; comparing each identifier in the first data model with each identifier in the second data model to identify each node in the first data model not having matching identifiers with any node in the second data model and to link each pair of nodes having matching identifiers; and applying comparison rules to the contexts of each linked pair of nodes to identify differences therebetween.

19 Claims, 7 Drawing Sheets

```
<library>
    <!-- this class represents a table that displays Product objects -->
    <class name="ProductGrid" extends="ObjectGrid">
        <!-- this widget displays the "name" of the product as a column in the table -->
        <gridText propertyName="name" objectPath="Product"/>

<!-- this widget displays the price of the product.
            The price is stored within the Price object with is a child of the Product object -->
        <gridPrice propertyName="price" objectPath="Product/Price"/>

<!-- this widget display the name of the currency for the price.
            The currency name is stored within the Price object.
            Note that it happens to have the same property name as the Product's name -->
        <gridText propertyNam="name" objectPath="Product/Price"/>
    </class>
</library>
```

FIGURE 4b 410

```
<library>
    <!-- this class represents a table that displays Product objects -->
    <class name="ProductGrid" extends="ObjectGrid">
        <!-- this widget displays the "name" of the product as a column in the table -->
        <gridText propertyName="name" objectPath="Product"/>

<!-- this widget displays the "warrantyTerm" of the product -->
        <gridText propertyName="warrantyTerm" objectPath="Product"/>         — 412

<!-- this widget displays the price of the product.
            The price is stored within the Price object with is a child of the Product object -->
        <gridPrice propertyName="price" objectPath="Product/Price"/>

<!-- this widget display the name of the currency for the price.
            The currency name is stored within the Price object.
            Note that it happens to have the same property name as the Product's name -->
        <gridText propertyNam="name" objectPath="Product/Price"/>
    </class>

<class name="MyGrid" extends="ObjectGrid">
        <gridText propertyName="name" objectPath="MyObject"/>               — 414
    </class>
</library>
```

FIGURE 4c                                                     420

```
<library>
    <!-- this class represents a table that displays Product objects -->
    <class name="ProductGrid" extends="ObjectGrid">
        <!-- this widget displays the "name" of the product as a column in the table -->
        <gridText propertyName="name" objectPath="Product"/>

<!-- this widget displays the "category" of the product -->         426
        <gridText propertyName="category" objectPath="Product"/>

<!-- this widget displays the price of the product.
             The price is stored within the Price object with is a child of the Product object -->
        <gridPrice propertyName="price" objectPath="Product/Price"/>

<!-- this widget display the name of the currency for the price.
             The currency name is stored within the Price object.
             Note that it happens to have the same property name as the Product's name -->
        <gridText propertyNam="name" objectPath="Product/Price"/>
    </class>
</library>
```

FIGURE 4d 430

```
<library>
    <!-- this class represents a table that displays Product objects -->
    <class name="ProductGrid" extends="ObjectGrid">
        <!-- this widget displays the "name" of the product as a column in the table -->
        <gridText propertyName="name" objectPath="Product"/>

<!-- this widget displays the "category" of the product -->        ── 436
        <gridText propertyName="category" objectPath="Product"/>

<!-- this widget displays the "warrantyTerm" of the product -->    ── 432
        <gridText propertyName="warrantyTerm" objectPath="Product"/>

<!-- this widget displays the price of the product.
             The price is stored within the Price object with is a child of the Product object -->
        <gridPrice propertyName="price" objectPath="Product/Price"/>

<!-- this widget display the name of the currency for the price.
             The currency name is stored within the Price object.
             Note that it happens to have the same property name as the Product's name -->
        <gridText propertyNam="name" objectPath="Product/Price"/>
    </class>

<class name="MyGrid" extends="ObjectGrid">
        <gridText propertyName="name" objectPath="MyObject"/>    ── 434
    </class>
</library>
```

FIGURE 5

COMPARING AND MERGING STRUCTURED DOCUMENTS SYNTACTICALLY AND SEMANTICALLY

CROSS-REFERENCE TO RELATED APPLICATIONS

The present application is co-pending with the concurrently filed application ser. No. 12/238,135, entitled "FRAMEWORK FOR AUTOMATICALLY MERGING CUSTOMIZATIONS TO STRUCTURED CODE THAT HAS BEEN REFACTORED," assigned to the assignee of the present application, the contents of which are incorporated herein by reference in their entirety.

BACKGROUND

Exemplary embodiments of the present invention relate to structured software documents, and more particularly, to performing three-way merge operations on such documents.

Version control refers to the management of different versions and variants of data files and software. As software is developed, designed, and deployed, it is extremely common for multiple states, or versions, of the same software to be deployed in different sites, as well as for the software's developers to be working simultaneously on updates. Code reuse, which refers to the use of existing software to update software or implement new software, is based on the idea that a partial or complete computer program written at one time can be, should be, or is being used in another program written at a later time. Programmers have reused sections of code, templates, functions, and procedures from the earliest days of programming to save time and energy by reducing redundant development work. The most common type of reuse of is the reuse of software components, but other artifacts produced during the software development process such as system architecture, analysis models, design models, design patterns, database schemas, web services can also be reused. The general development practice of using a prior version of an extant program as a starting point for the next version is a standard form of code reuse.

A more typical example of code reuse is the topic of end-user development (EUD), which refers to activities or techniques that allow people who are not professional developers to create or modify a software artifact. EUD may be viewed as essentially out-sourcing the development effort to the end user. A common instance of EUD is programming to extend and adapt an existing application package (for example, an office suite). Two main reasons why EUD has become popular are because organizations can use EUD to effectively cut the time of completion on a project and because software tools are more powerful and easier to use. A drawback with the implementation of EUD, however, is that it can increase the complexity of software maintenance, which generally involves the modification of a software product after delivery to correct faults, to improve performance or other attributes, or to adapt the product to a modified environment. In particular, where an end-user has made individual customizations to programming code, it is difficult for the original developer of that code to account for these customizations in considering the processes of implementation and product acceptance for the maintenance modifications.

Three-way merging refers to techniques employed for reintegrating changes made in parallel to multiple independently modified copies of a base software artifact into a single, unified copy of the software artifact containing the changes. As an integral part of performing a three-way merge, the edits made between a base document of the software artifact and modified versions of the document are first detected so that the modifications made can be merged into the unified version. The existing solutions and tools for performing a three-way merge such as, for example, diff, patch, and Eclipse Compare, consider the structure of its input documents (that is, the base document and the modified documents) to be an ordered list of text lines. When used with structured documents, however, these existing merge solutions are difficult to use and not useful for preventing inconsistencies when performing the merge without requiring a user to read the content of the documents to determine the differences. The existing solutions, for example, are not able to address situations where order is important for some elements in a document but not important for other elements in the document, situations where elements are moved within a document or to another document within the software artifact, or situations where a complex semantic structure of the software code must be taken into consideration to perform a successful merge.

SUMMARY

An exemplary embodiment of a method of performing a syntactic and semantic three-way merge of structured software documents includes receiving a first version of a document coded in a structured programming language containing a first plurality of elements, a second version of the document containing a second plurality of elements, and a third version of the document containing a third plurality of elements; deserializing the first, second, and third versions of the document to generate a first data model, a second data model, and a third data model respectively representing the first, second, and third versions in a first data store, each data model comprising a tree data structure that includes a corresponding node for each element of the plurality of elements contained within the version of the document represented by the data model, each node of each data model containing a context describing the element corresponding to the node; generating an identifier for each node of each data model in the first data store that is unique to the node within the data model by applying a set of identifier determination rules to the context describing the element corresponding to the node; comparing the identifier for each node in the first data model with the identifier for each node in the second data model to identify each node in the first data model not having matching identifiers with any node in the second data model in the first data store and to link each pair of nodes in the first and second data models that have matching identifiers; and applying a set of comparison rules to the contexts of each linked pair of nodes in the first and second data models to identify differences between each linked pair of nodes in the first and second data models in the first data store.

Exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIGS. 4a-4d are sample sets of structured code illustrating an example merge operated performed by the exemplary comparison and merging system illustrated in FIG. 1.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Exemplary embodiments of the present invention can be implemented to provide a mechanism for performing a three-way comparison and merge of versions of a software artifact that includes a set of structured documents, such as documents formatted in accordance with the eXtensible Markup Language (XML), both syntactically and semantically. In particular, exemplary embodiments can provide a generic and complete solution for comparing and merging of versions of structured documents that are not defined by a schema and are formatted according to semantic constraints to include a number of elements that may be ordered or unordered. As used herein, the term "data element" refers to an atomic unit of data that includes an identification such as a data element name, a data element definition, and one or more representation terms. By considering the semantics of the documents and not requiring a schema to be defined for the documents, exemplary embodiments can therefore be applied to any type of structured documents. Furthermore, exemplary embodiments can be implemented to provide a pluggable framework that allows users to easily customize the comparison and merge logic according to specific requirements.

In general, exemplary embodiments of the present invention can be implemented to accept three structured documents as input and process these input documents to generate a fourth structured document as output. The first input document is a common ancestor of the second and third input documents, and is referred to herein as the base document. The second input document is a version of the base document that includes customized modifications to the elements of the base document, and is referred to herein as the customized base document. The third input document is an updated version of the base document that contains updates to the elements of the base document, and is referred to herein as the updated document. For purposes of describing exemplary embodiments, it is assumed that the modifications made to the base document to produce the customized base document and the updates made to the base document to produce the updated document were made independently and in parallel. The fourth document includes all the modifications made to the base document to produce the customized base document and all the updates made to the base document to produce the updated document, and is referred to herein as the customized updated document.

In general, exemplary embodiments can be implemented to generate the customized updated document for output by deserializing each of the three input documents according to a generic memory model to generate a hierarchical, tree-structured representation of each input document, comparing the tree-structured representations of the base document and the customized base document to identify the modifications made to the base document in the customized base document, comparing the tree-structured representations of the base document and the updated document to identify the updates made to the base document in the updated document, comparing the tree-structured representations of the customized base document and the updated document to identify the differences therebetween, generating a tree-structured representation of the updated document that includes the identified modifications made to the base document in the customized base document by referencing the identified updates made to the base document in the updated document and the identified differences between the customized base document and the updated document, and serializing the tree-structured representation of the updated document that includes the identified modifications made to the base document in the customized base document to generate the customized updated document.

The comparison and merge process generally outlined above will be described in greater detail herein with reference to exemplary embodiments in which the structured documents are XML documents that are not defined by an XML schema and are formatted according to semantic constraints to include a number of elements that may be ordered or unordered. It should, of course, be understood that this scenario is exemplary only, and that alternative exemplary embodiments of the present invention can be implemented to provide a mechanism for merging versions of structured documents of any type, not just XML-language documents. Exemplary embodiments can be applied to documents coded in a wide range of structured languages including, for example, HTML, WML, XHTML, DHTML, or other SGML derivatives, as well as other structured languages such as user interface markup languages (for example, UIML, XAL, SVG, XAML, and LZX), the programming languages Pascal and C, and languages used to define two- or three-dimensional layouts, structures, or integrated circuits. Exemplary embodiments can also be applied to documents coded in structured languages used for storing scientific information, engineering information, business information, games, cryptography, and other areas of information technology. A document written in a structured language will generally have a hierarchical structure of elements in which the structure is generally defined by tags (that is, sequences of characters in the document). It should also be noted that exemplary embodiments can be implemented to provide a mechanism for merging structured documents that comprise any aspect(s) of any suitable type of software artifact such as software components, application packages, system architectures, analysis models, design models, design patterns, database schemas, web services, and the like.

The XML standard is governed by the World Wide Web Consortium, and is maintained on the Internet at the web site of the World Wide Web Consortium (W3C). XML describes a class of data objects called XML documents and partially describes the behavior of computer programs which process them. An XML document is a structured, self-descriptive document having a collection of elements, and that facilitates some form of automatic semantic integration. Thus, as used herein, the terms "XML element" or "XML data element" refers to the code terms contained between a set of brackets as defined by the rules of XML. XML is classified as an extensible language because it allows users to define their own elements, which contain either parsed or unparsed data. Parsed data is made up of characters, some of which form character data, and some of which form markup. Each element may have a list of associated attributes and elements. An element may refer to other elements to cause their inclusion in the document. A document begins in a "root" or document element. Markup encodes a description of the document's storage layout and logical structure. Logically, the document is composed of declarations, elements, comments, character references, and processing instructions, all of which are indicated in the document by explicit markup. XML provides a mechanism to impose constraints on the storage layout and logical structure. By adding these semantic constraints, application languages can be implemented in XML.

The following example scenario involving the merging of versions of a software artifact that includes customizable XML documents for which no XML schema has been defined illustrates some of the issues that may arise during maintenance of the software artifacts for which exemplary embodiments of the present invention can be implemented to address. In the example scenario, a software vendor initially produces 'version 1' of the code for an application package that includes a set of customizable XML documents. The XML documents are provided according to specified semantic constraints, but no XML schema is defined for the documents. A customer purchases version 1 of the application package and, understanding the semantics of the XML documents, customizes the application code by modifying elements of the XML documents. The customer may also define new elements for use in the customizable documents. The vendor then decides to enhance the application package by adding new functionality, some of which will be implemented through updates to the customizable XML documents. The vender's code for the updated version of the application, 'version 2', is based on version 1.

The customer then decides to upgrade to version 2 of the application. Because the user has customized the XML documents in version 1, to get the new features of version 2 without losing the customizations, the modifications that were made by the customer to the XML documents for version 1 will need to be merged into the XML documents of version 2. Certain elements of the XML documents for version 1 of the application package that were modified by the customer, however, may not exist or be structured differently in version 2. Using prior art merging techniques, these customizations will need to be integrated manually. Exemplary embodiments of the present invention, however, can provide a generic and complete merging solution for generating a customized version 2 of the application package that includes all the modifications made by the customer to version 1 and all the enhancements added by the vendor in version 2.

Figure 1:
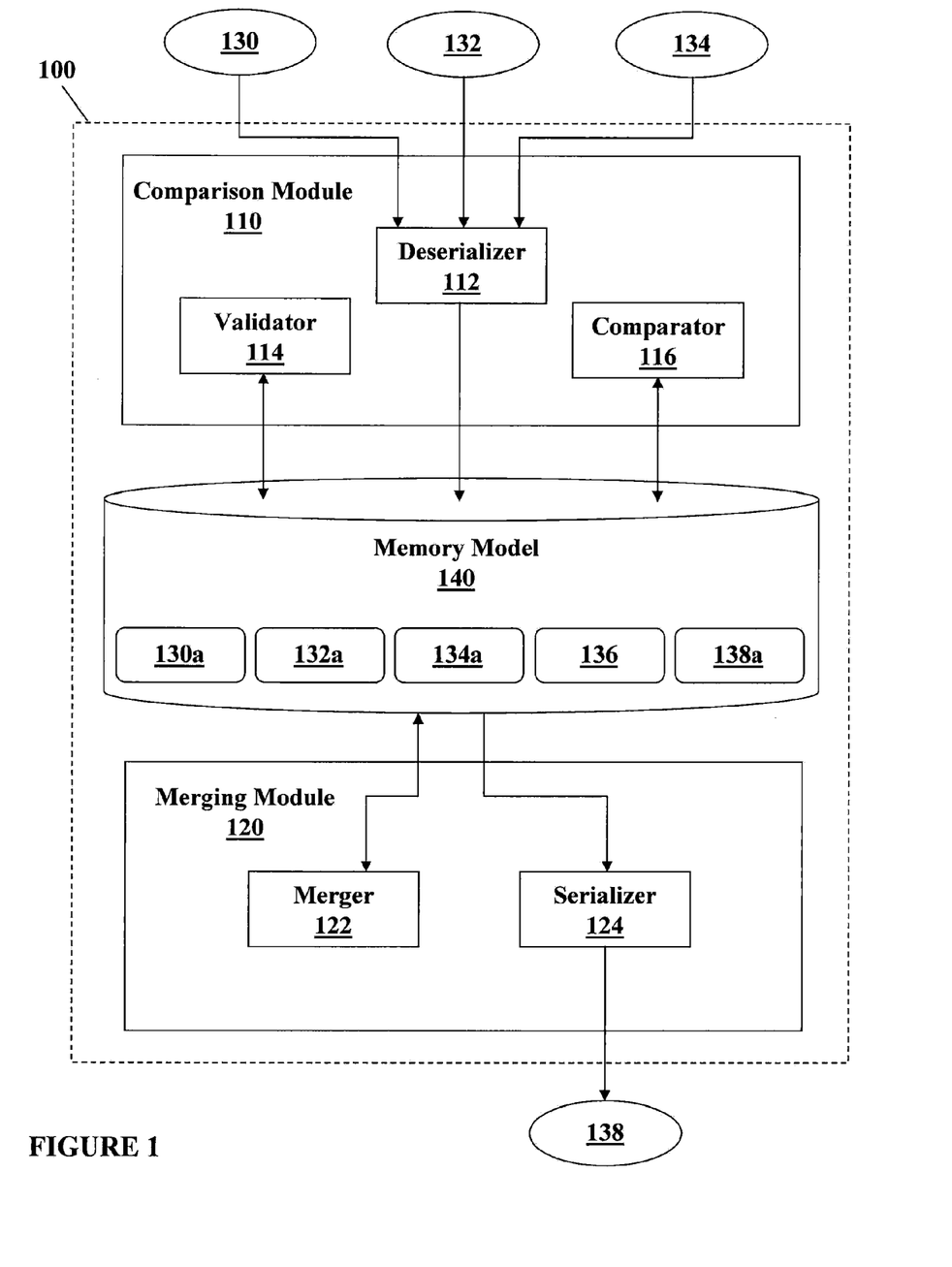
FIG. 1 is a block diagram illustrating an exemplary embodiment of a comparison and merging system in accordance with the present invention.

Referring now to FIG. 1, an exemplary embodiment of a comparison and merging system 100 in accordance with the present invention. As will be described, comparison and merging system 100 is implemented to perform a three-way comparison and merge of XML documents both syntactically and semantically. Comparison and merging system 100 provides a generic and complete solution for comparing and merging of structured documents that are not defined by a schema and are formatted according to semantic constraints to include a number of elements that may be ordered or unordered. Generally, system 100 includes a comparison module 110, a merging module 120, and a generic memory model data store 140. As used herein, the terms "module" and "program module" both include routines, programs, objects, components, data structures, and instructions, or instructions sets, and so forth that perform particular tasks or implement particular abstract data types. As can be appreciated, the modules can be implemented as software, hardware, firmware and/or other suitable components that provide the described functionality, which may be loaded into memory of a machine embodying exemplary embodiments of a version comparison mechanism in accordance with the present invention. Aspects of the modules may be written in a variety of programming languages, such as C, C++, Java, etc. As used herein, the term "data store" refers to any suitable memory device that may be used for storing data, including manual files, machine-readable files, and databases. A data store may be organized in various ways, including as a relational, hierarchical, or object-oriented data store. The functionality provided by the modules and data stores described with reference to exemplary embodiments herein may be combined and/or further partitioned. In exemplary embodiments, comparison and merge system 100 may itself be a computer-implemented system, such as part of a computing device, like a computer, which has one or more processors, memory, storage, and/or other components as known within the art.

In the present exemplary embodiment, comparison module 110 includes a memory model deserializer 112, a unique ID validator 114, and a source code comparator 116. Comparison module 110 is configured to accept a base XML document 130, a customized base XML document 132, and an updated XML document 134 as input. Base document 132 is a common ancestor of customized base document 132 and updated document 134. Customized base document 132 is a version of base document 130 that includes customized modifications to the XML elements of the base document. Updated document 134 is an updated version of base document 130 that contains updates to the XML elements of the base document. As will be described, comparison module 110 is implemented to generate a memory model representation of each input document in generic memory model 140, to compare the three memory model representations of the three input document to identify the differences therebetween, and to update the generic memory model to include information regarding the identified differences between the input documents. The information provided in memory model 140 by comparison module 110 can thereby be accessed to enable merging module 120 to merge customized base document 132 and updated document 134 into a unified, customized updated document 138 that includes all the modifications made to the base document to produce the customized base document and all the updates made to the base document to produce the updated document. For purposes of the present exemplary embodiment, it is assumed that the modifications made to the base document to produce the customized base document and the updates made to the base document to produce the updated document were made independently and in parallel.

In the present exemplary embodiment, deserializer 112 is configured to deserialize each of the three input documents to generate and store a memory model representation of each input document into memory model 140. Each memory model representation takes the form of a hierarchical, node-labeled tree data structure. A tree data structure, which is an acyclic and connected graph having a set of linked nodes, is commonly used for representing XML documents, which utilize a tree-based semantical structure that has exactly one root element. Trees may be manipulated in more complex ways than ordered lists of text lines. For instance, in the present exemplary embodiment, the tree-structured memory model representations of the documents can each include a number of ordered and/or unordered nodes. Each node in a tree has zero or more child nodes, which are below it in the tree (by convention, trees grow down, not up as they do in nature). A node that has a child is called the child's parent node (or ancestor node, or superior). The topmost node in a tree is called the root node. Being the topmost node, the root node will not have parents. As shown in FIG. 1, deserializer 112 operates to deserialize base document 130, customized base document 132, and updated document 134 into base data model representation 130a, customized base data model representation 132b, and updated data model representation 134b respectively.

The memory model representations generated by deserializer 112 operate to automatically create a mapping relationship between the elements of the input XML documents that is sufficiently flexible to satisfy the requirements of the syntactical and semantical comparison performed by comparator 116, as will be described in greater detail below. In the representation form maintained in memory model 140, each XML element of a represented document corresponds to a tree node in the representation. Each such tree node has a context that contains: (a) the attributes of the corresponding XML element; (b) all descendent XML elements (and their respective attributes) of the corresponding element; and (c) a unique identifier for the node. By this definition, it can be seen that node contexts are hierarchical. The children of a node are the elements contained in the element corresponding to the node.

To account for the fact that some XML documents can be provided with a semantic for which order is not important for some or all of the elements, the memory model representations employ the concept of the unique identifier to identify counterpart elements across documents. Unique identifiers provide a reliable marker for comparator 116 to access when identifying differences between documents that ensures that element contents are compared under the correct corresponding parent element. A unique identifier for a node includes the name of the corresponding element and zero or more attribute values of the corresponding element. To generate the unique identifier of each node context, deserializer 112 employs a repository of identifier determination rules that are applied to each of the XML elements according to the values of one or more attributes of the element. In exemplary embodiments, deserializer 112 can be implemented to provide a pluggable framework for the repository of identifier determination rules for generating the unique identifiers that supports easy addition and modification of identifier determination rules. For example, the unique identifiers for each node can be generated according to any suitable implementation of alternative identifier determination rules that allow for each node to be distinctly identified without relying on the name and/or attributes of the corresponding element. The generation of unique identifiers performed by deserializer 112 is dependent upon the identifier determination rules in the pluggable repository. Thus, deserializer 112 is flexible in that a user can control the details of identifier determination and thereby tailor the unique identifiers to meet the requirements of specific applications.

Under the memory model of the present exemplary embodiment, sibling nodes cannot have the same unique identifier. To satisfy this requirement, deserializer 112 can be configured to generate unique identifiers that have different composite sets of attribute values for different corresponding element types. Thus, the memory model representations, there can be two different forms of unique identifiers. In the first type, the name of the XML element represented by the node is used without any attribute values to form the unique identifier. In such a case, it is expected that only one node context of this type occurs within a memory model representation of a document. In the second type of unique identifier, the name of the XML element represented by the node and each value of one or more attributes of the element are used to form the unique identifier. In such a case, there may be more than one node with this element name contained within a memory model representation of a document, and the values of the one or more selected attributes in the unique identifiers are used to distinguish each node.

It is not required that the values of all the attributes for an XML element be included in the unique identifier for the node corresponding to the element as long as the values or the combinations of values are unique to a parent node and each descendent node under the parent separately. To this end, validator 114, in addition to otherwise ensuring that each memory model representation is well formed, is configured to validate that each unique identifier in the memory model representation of each document is unique within the generated representation.

In the present exemplary embodiment, comparator 116 is configured to perform a comparison between base representation 130a and customized base representation 132b to identify the modifications made to base document 130 in customized base document 132, between base representation 130a and updated representation 134b to identify the updates made to base document 130 in updated document 134, and between customized base representation 132b and updated representation 134b to identify the differences between customized base document 132 and updated document 134. Comparator is further configured to generate and update a set of comparison result information 136 maintained in memory model 140 to include correspondence information regarding the identified differences between the three input documents.

The unique identifiers having composite sets of attribute values provide for a flexible, reliable, and transparent mechanism for use by comparator 116 in performing the comparisons to accurately determine the differences between two documents by taking into consideration the semantics of the document. Under the memory model, an element in one XML document is considered a counterpart of another element in a different XML document if the corresponding nodes for both elements have the same unique identifiers in the memory model representations of the documents. Counterpart elements are identical if their corresponding nodes have the same unique identifier and equivalent values for each of the corresponding attributes in the composite attribute set.

In exemplary embodiments in which the documents being merged are customizable parts of versions of a software artifact initially implemented by an application vendor, the unique identifiers must remain consistent between the versions provided by the vendor. Customers that make modifications to a version of the software artifact, however, are not required to have unique identifiers defined for elements they add or customize. When a customer changes any part of an element used to generate a unique identifier for the node corresponding to the changed element, this will have the same effect in comparison and merging system 100 as if that element were deleted in the new version and then added as new element to the new version. This can be used as a way for the customer to provide an indication within a memory model node corresponding to an element of a represented document that they do not desire to have any updates that the vendor provides for that element merged.

Comparator 116 employs a pluggable repository of comparison rules for performing the comparison between the memory model representations of the documents to determine the differences therebetween. To identify the "same" node in two different memory model representations, the comparison rules are configured to be applied to link counterpart nodes (that is, nodes having the same unique identifier in the two representations being compared) in the two representations of the documents being compared and to generate information about the differences between the elements corresponding to the counterpart nodes in the two documents during the comparison. In exemplary embodiments, comparator 116 can be implemented to provide a mechanism through which additional rules can be added to the pluggable repository of comparison rules so that more information about the differences between the elements of the two documents being compared can be determined. The comparison performed by comparator 116 is dependent upon the comparison rules in the pluggable repository. Thus, comparator 116 is flexible in that a user can control the details of the comparison and thereby tailor the information generated in particular comparisons to meet the requirements of specific applications.

In exemplary embodiments, to compare two documents and identify information regarding the differences therebetween, comparator 116 can be implemented to compare each element in one document being compared with each element in the other document being compared. Comparator 116 can perform these comparisons to update memory model 140 to include information regarding the following differences identified by comparing each pair of the three input documents: (1) elements that exist in one document but not the other (that is, elements that have been deleted or added); (2) counterpart elements having children elements that are in differing orders in the two documents (when the semantic constraints for the documents specify that order matters for these elements); (3) counterpart elements having attributes that have the same values in the two documents; (4) counterpart elements having different values for attributes that are not part of the unique identifiers for the nodes corresponding to the elements; and (5) counterpart elements having different numbers of attributes that are not part of the unique identifiers for the nodes corresponding to the elements (that is, attributes that have been added or deleted). Because additional rules can be added to the pluggable repository of comparison rules, a user can easily specify that more information should be included in memory model 140 regarding the differences between each pair of the three input documents. Furthermore, a user can specify different comparison rules to determine differences for each element in each document (for example, specifying whether order is important or whether whitespace should be considered).

Figure 2:
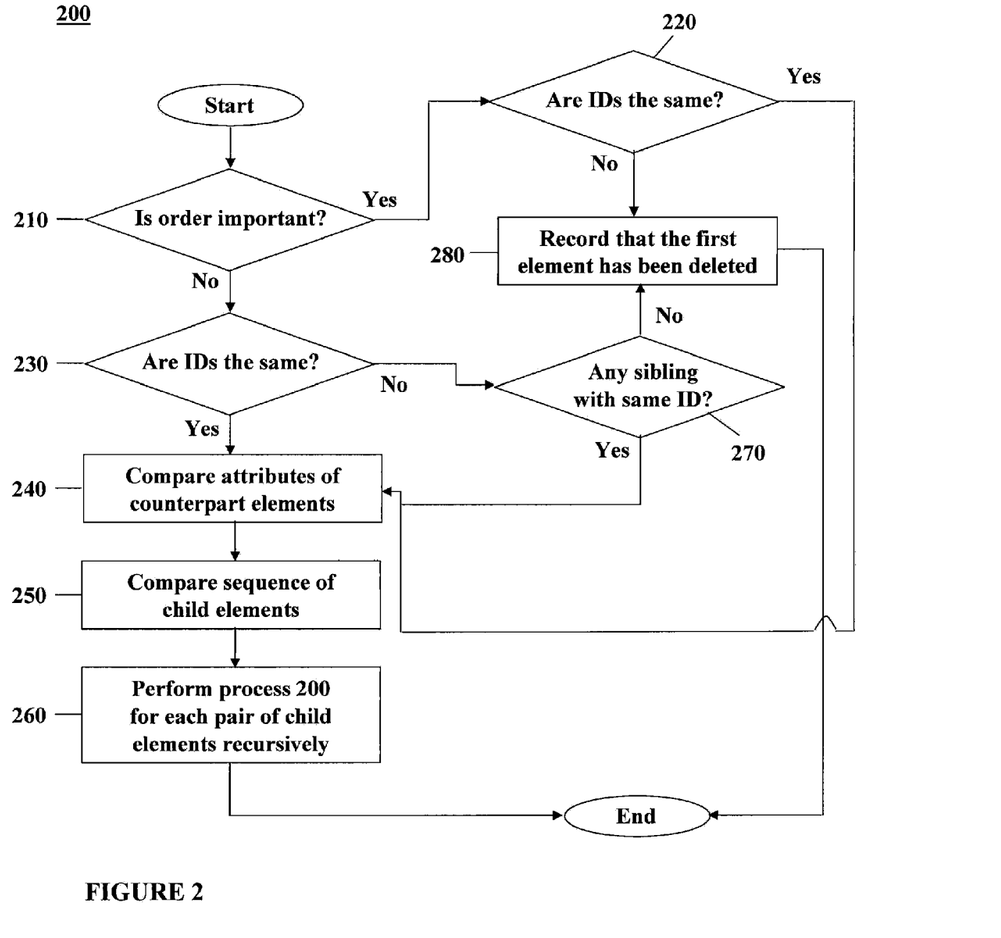
FIG. 2 is a flow chart illustrating an exemplary embodiment of a process of comparing two XML elements in two different XML documents to determine their differences.

Referring now to FIG. 2, a flow chart illustrating an exemplary embodiment of a process 200 that may be performed by comparator 116 for comparing two XML elements in two different XML documents to determine their differences by accessing the contexts of nodes corresponding to those elements in the memory model representations of the documents being compared is provided. To compare two documents and identify information regarding the differences therebetween, comparator 116 can be implemented to access memory model 140 and repeatedly perform exemplary process 200 to compare each element in one document being compared with each element in the other document being compared. Comparator 116 can be configured to perform a comparison in this manner between base representation 130a and customized base representation 132b to identify the modifications made to base document 130 in customized base document 132, between base representation 130a and updated representation 134b to identify the updates made to base document 130 in updated document 134, and between customized base representation 132b and updated representation 134b to identify the differences between customized base document 132 and updated document 134.

Exemplary process 200 begins at decision block 210 by determining if the XML documents containing the element being compared are provided with a semantic specifying that order is not important for the element. If the XML documents are provided with a semantic specifying that order is important, process 200 proceeds to decision block 220 and determines if the respective unique identifiers for the nodes corresponding to the elements in the memory model representations for the documents being compared are the same. If it is determined at decision block 220 that the respective unique identifiers are not the same, process 200 proceeds to block 280 and records that the first element being compared does not exist in the document containing the second element being compared. Process 200 then terminates. If it is determined at decision block 210 that the XML documents of the application package are provided with a semantic specifying that order is not important for the element, process 200 proceeds to decision block 230 and determines if the respective unique identifiers for the nodes corresponding to the elements in the memory model representations for the documents being compared are the same.

If it is determined either at decision block 220 or at decision block 230 that the respective unique identifiers for the nodes corresponding to the two elements being compared are the same, the two elements being compared are counterpart elements, and process 200 proceeds to block 240. At block 240, the attributes of the two counterpart elements, as provided in the memory model representation contexts of the nodes corresponding to the elements, are compared to identify any added attributes, identify any deleted attributes, and identify any attributes with changed values. Then, at block 250, the sequences of the child elements of the two counterpart elements, as provided in the memory model representation contexts of the nodes corresponding to the elements, are compared based on the unique identifiers for the child elements to identify any differences in the child element sequences of the two counterpart elements. Process 200 then proceeds to block 260, at which each child element of one of the elements being compared is compared with each child element of the other element being compared. To perform each of these child element comparisons at block 260, a new instance of exemplary process 200 is called recursively. The information regarding the differences between the elements identified during the comparisons made at blocks 240-260 is recorded in the generic memory model. When each recursive call made to process 200 at block 260 has returned, process 200 terminates.

If it is determined at decision block 230 that the respective unique identifiers for the nodes corresponding to the two elements being compared are not the same, process 200 proceeds to decision block 270, at which it is determined whether the unique identifier for the node corresponding to the first element being compared is the same as any of the unique identifiers for the nodes corresponding to the sibling elements of the second element being compared. If it is determined that the unique identifier for the node corresponding to the first element is the not same as any of the unique identifiers for the nodes corresponding to the sibling elements of the second element, process 200 proceeds to block 280 and records that the first element being compared does not exist in the document containing the second element being compared. If it is determined at block 230 that the unique identifier for the node corresponding to the first element is the same as the unique identifiers for a nodes corresponding to a sibling element of the second element, process 200 proceeds to block 240 and performs the comparisons described above at blocks 240-260 between the first element and the matching sibling element of the second element. When each recursive call made to process 200 at block 260 has returned, after information regarding the differences between the elements identified during the comparisons made at blocks 240-260 is recorded in the generic memory model, process 200 terminates.

Referring again to the exemplary embodiment described with reference to FIG. 1, after comparator 116 performs the comparison between each pair of the three input documents, merging module 120 is implemented to access and process the information maintained in memory model 140 to generate customized updated document 138. Merging module 120 includes a three-way source code merger 122 and a memory model serializer 124. Merger 122 is configured to access memory model 140 and a merging operation on the information maintained for updated representation 134*a* and comparison result information 136 to generate a customized updated representation 138*a* of customized updated document 138. Customized updated representation 138*a*, which is stored and maintained in memory model 140 by merger 122, is a tree-structured memory model representation of the updated document that includes all the modifications made to base document 130 to produce customized base document 132 and all the updates made to base document 130 to produce updated document 134. Memory model serializer 124 is configured to serialize customized updated representation 138*a* to generate customized updated document 138, which is an XML document that accords with the semantic constraints specified for the input documents.

Merger 122 is configured to perform a three-way merge on a copy of updated representation 138*a* based upon the correspondence information regarding the identified differences between the three input documents provided by comparison result information 136. In many cases, the correct output of the merge operation will depend on the semantic constraints of the data (for example, whether elements are specified as ordered or unordered). These semantic constraints should be considered during the merge operation where, for example, sibling or parent elements have been deleted or moved. To account for these semantic constraints, the unique identifiers for the nodes corresponding to the elements of the documents provide a flexible, reliable, and transparent mechanism for merger 124 to access when merging the correspondence information regarding the identified differences between the three input documents that ensures that element contents are merged under the correct corresponding parent element. Thus, the memory model representations generated by deserializer 112 operate to automatically create a mapping relationship between the elements of the input XML documents that is able to satisfy the requirements of the syntactical and semantical merge operation performed by merger 122.

Merger 122 performs the merge operation in accordance with a repository of merge rules specified for the elements. In exemplary embodiments, merger 122 can be implemented to provide a pluggable framework for the repository of merge rules for performing the merge that supports easy addition and modification of merge rules. For example, a user can specify whether order should be maintained, whether formatting be maintained, whether comments should be preserved, where a new element should inserted, instructions on how to handle situations where sibling elements have been reordered, etc. The merge operation performed by merger 122 is dependent upon the merge rules in the pluggable repository. Thus, merger 122 is flexible in that a user can control the details of the merge rules and thereby tailor the merge operation to meet the requirements of specific applications.

Figure 3:
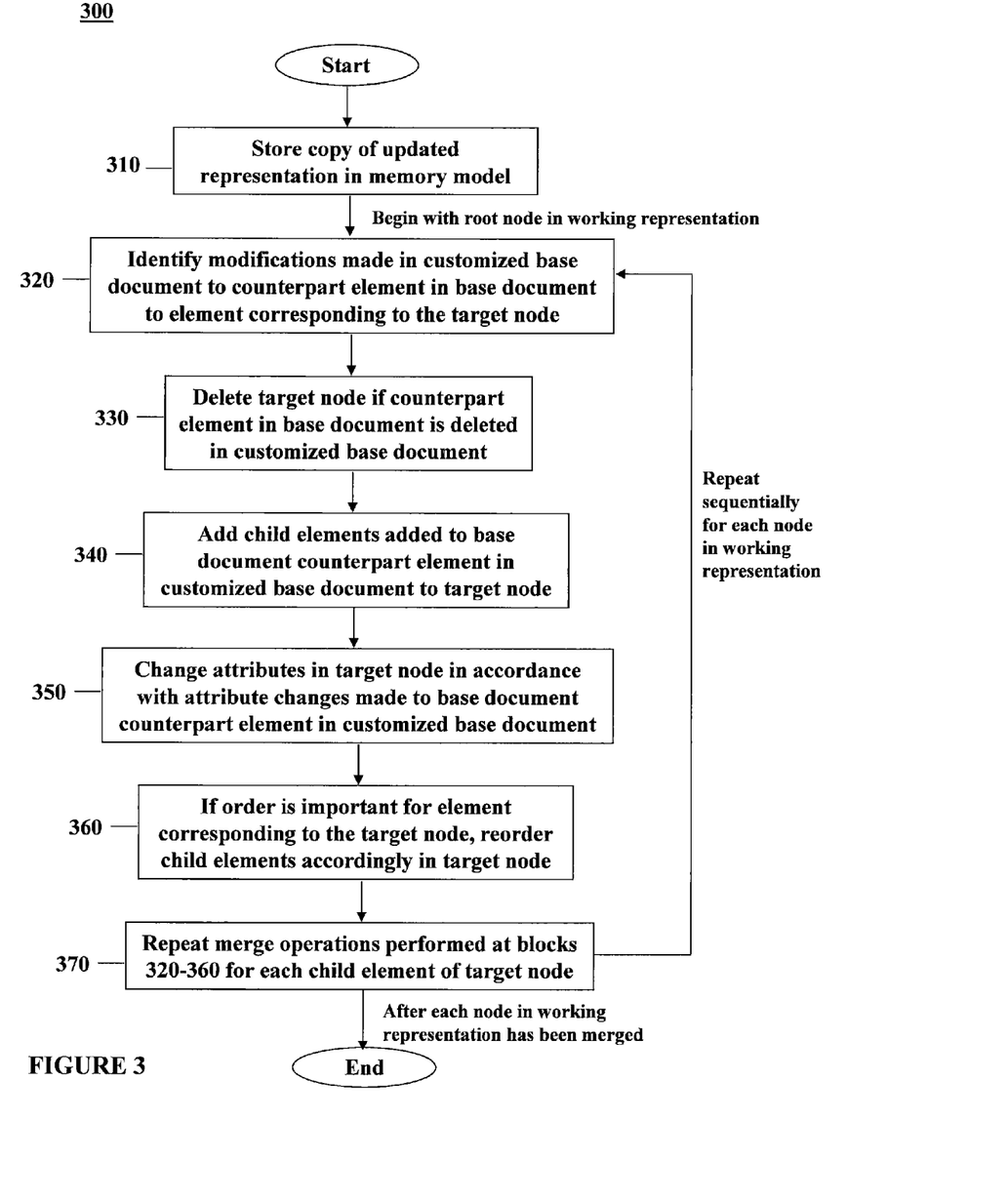
FIG. 3 is a flow chart illustrating an exemplary embodiment of a process of performing a three-way merge operation on structured documents.

Referring now to FIG. 3, a flow chart illustrating an exemplary embodiment of a process 300 that may be performed by merger 122 for performing a three-way merge of base representation 130*a*, customized base representation 132*a*, and updated representation 134*a* to generate customized updated representation 138*a* is illustrated. Exemplary process 300 begins at block 310, at which a copy of updated representation 134*a* is stored in memory model 140 to provide a working memory model representation used for generating customized updated representation 138*a*. Customized updated representation 138*a* will be the result of all changes being will be merged into this working representation. The operations performed by the remaining blocks of process 300 are repeated sequentially for each node in the working representation. A single iteration of these operations will now be described with reference to a target node of the working representation.

At block 320 of exemplary process 300, merger 122 accesses comparison result information 136 to identify each modification made in customized base document 132 to the counterpart element in base document 130 to the element corresponding to the target node. As described above, under the memory model, an element in one XML document is considered a counterpart of another element in a different XML document if the corresponding nodes for both elements have the same unique identifiers in the memory model representations of the documents. At block 330, if the modifications identified at block 320 indicate that the counterpart element in base document 130 to the element corresponding to the target node has been deleted in customized base document 132, the target node is deleted from the working representation. At block 340, if the modifications identified at block 320 indicate that any new child elements have been added to the counterpart element in customized base document 132 to the element corresponding to the target node, these child elements are added to the target node in the working representation. At block 350, if the modifications identified at block 320 indicate that any changes have been made to the attributes of the counterpart element in customized base document 132 to the element corresponding to the target node, these attributes are changed accordingly in the target node in the working representation.

Exemplary process then proceeds to block 360, at which, if it determined whether the XML documents containing the element corresponding to the target node are provided with a semantic specifying that order is important for the element, the child elements are reordered accordingly in the target node in the working representation. Finally, at block 370, the merge operations performed at blocks 320-370 are repeated recursively for each child element of the target node.

As mentioned above, the operations performed in blocks 320-370 are repeated sequentially in exemplary of process 300 for each node in the working representation. The result of the merge operation performed by merging module 122 is customized updated representation 138a in memory model 140. Different types of conflicts can arise during performance of the merge operation where certain situations are present such as, for example, sequencing conflicts, move conflicts, or conflicts that occur where a value for an attribute of an element in base document 130 is changed in the counterpart element of both customized base document 132 and updated document 134. In exemplary embodiments, merging module 122 can be configured to utilize the correspondence information maintained in comparison result information 136 in memory model 140 for the modifications made to the base document to produce the customized base document and the updates made to the base document to produce the updated document to resolve these conflicts.

Once the merge operation has been performed by merging module 122 to generate customized updated representation 138a in memory model 140, memory model serializer 124 is configured to access the memory model and serialize the customized updated representation to generate customized updated document 138, which is an XML document that corresponds to a merged version of customized base document 132 and updated document 134, includes all the modifications made to base document 130 to produce the customized base document, includes all the updates made to the base document to produce the updated document, and, furthermore, accords with the semantic constraints specified for the input documents. Once generated by serializer 124, customized updated document 138 can be provided as output by comparison and merge system 100.

Figure 4C:
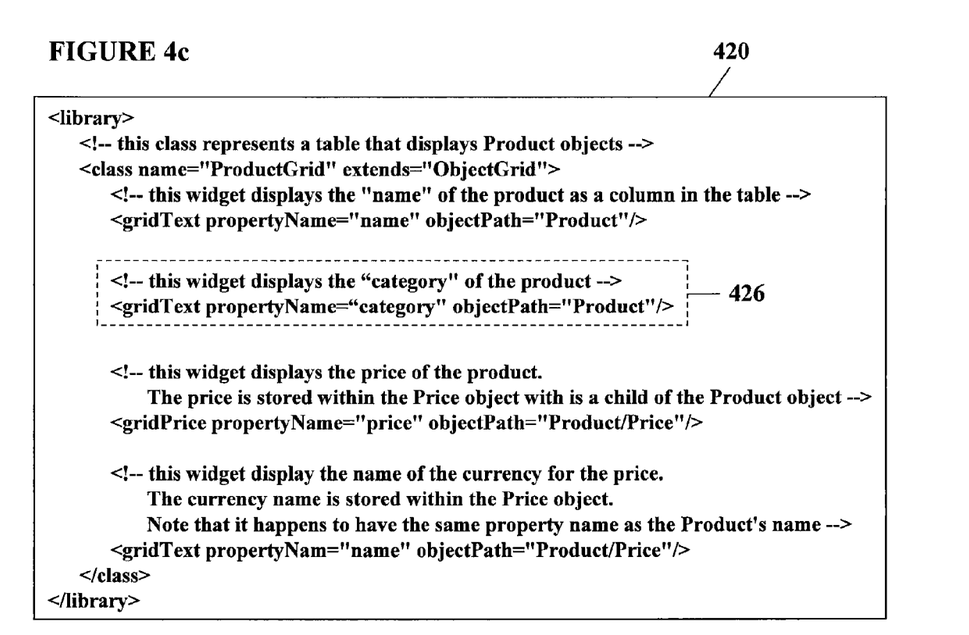

To illustrate the use of comparison and merge system 100 described with reference to the exemplary embodiment illustrated in FIG. 1, the merging example shown in FIGS. 4a-4d is considered. Particularly, in the present example, FIG. 4a provides a base XML document 400, FIG. 4b provides a customized version 410 of the base XML document, and FIG. 4c provides an updated version 420 of the base XML document. The unique identifiers generated by system 100 for the elements of the documents in this example are: (1) the element name for the element 'library' (as the semantics for the document specify that only one such element is allowed in a document); (2) the value of the 'name' attribute for the element 'class'; (3) the values of the 'propertyName' and 'objectPath' attributes for the element 'gridText'; and (4) the values of the 'propertyName' and 'objectPath' attributes for the element 'gridPrice'.

Figure 4D:
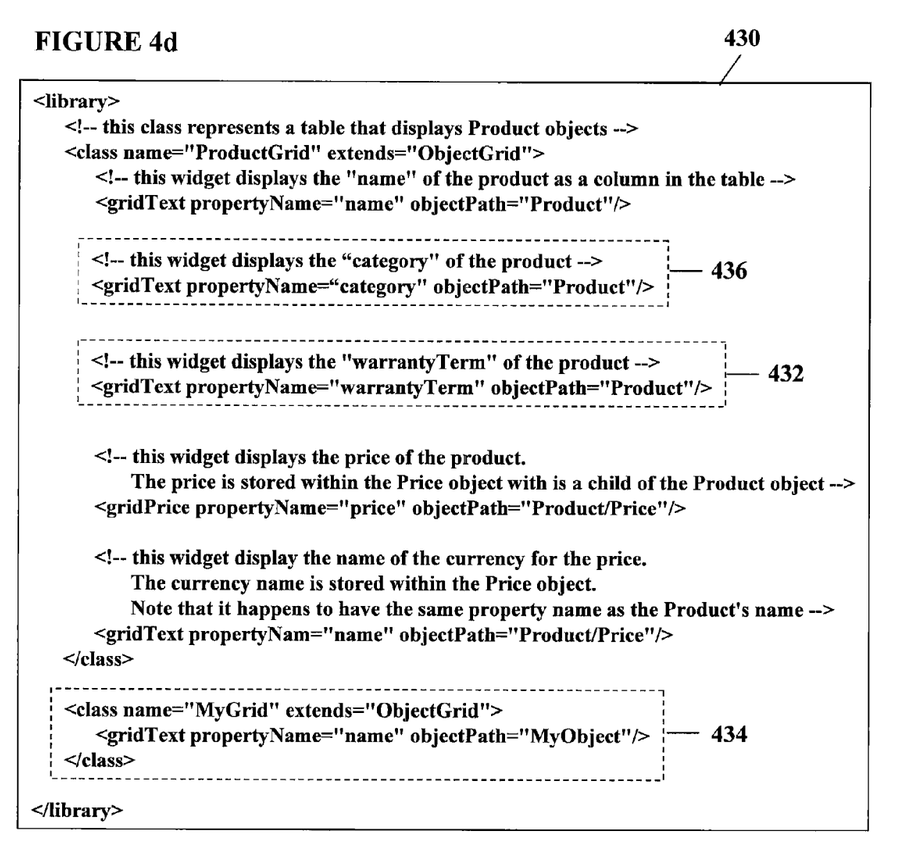

In the illustrated example of FIGS. 4a-4d, customized version 410 is a modified version of base document 400 that includes an inserted warranty term element 412 and an inserted display class definition element 414, and updated version 420 is a version of base document 400 that has been updated to include an inserted new feature element 426 that provides the ability to categorize products. Exemplary comparison and merge system 100 is configured to process the three documents depicted in FIGS. 4a-4c to generate a merged version 430 that includes the modifications made to base document 400 in customized version 410 (as indicated by reference numbers 432 and 434) and the updates made to base document 400 updated version 420, as shown in FIG. 4d (as indicated by reference number 436).

As discussed above, exemplary embodiments of the present invention can be implemented to perform a three-way merge of documents comprising code in structured documents of any type, not just XML-language documents. In the exemplary embodiment described with to comparison and merge system 100 illustrated in FIG. 1, only memory model deserializer 112 and memory model serializer 124 are implemented under the assumption that it is working with documents having an XML-language construct, while each of the other actor and handler modules described are working with memory model representations of the documents as provided according to the generic, hierarchical, tree-structured memory model. Thus, in alternative exemplary embodiments, merge solution tool framework 100 can be extended to handle non-XML languages, for example, in either of the following two ways: (1) replacing deserializer 112 and serializer 124 with corresponding handlers that understands non-XML languages; or (2) implementing a preprocessor to convert a non-XML language document to an XML format. Furthermore, in exemplary embodiments, the input and output documents and the memory model representations of the documents may each observe different syntax rules, and the nodes of the memory model representations can be generated utilizing a mechanism that is appropriate to the particular type of documents and elements being merged. For example, the input and output documents may have an HTML-language construct, while the memory model representations may have an XML language construct. In exemplary embodiments, comparison and merge system 100 can be implemented to perform a merge for documents of any structured language and to further translate the output merged document into another language. Thus, exemplary embodiments can be provided with substantial versatility concerning document types.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be implemented using one or more program modules and data storage units. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 5:
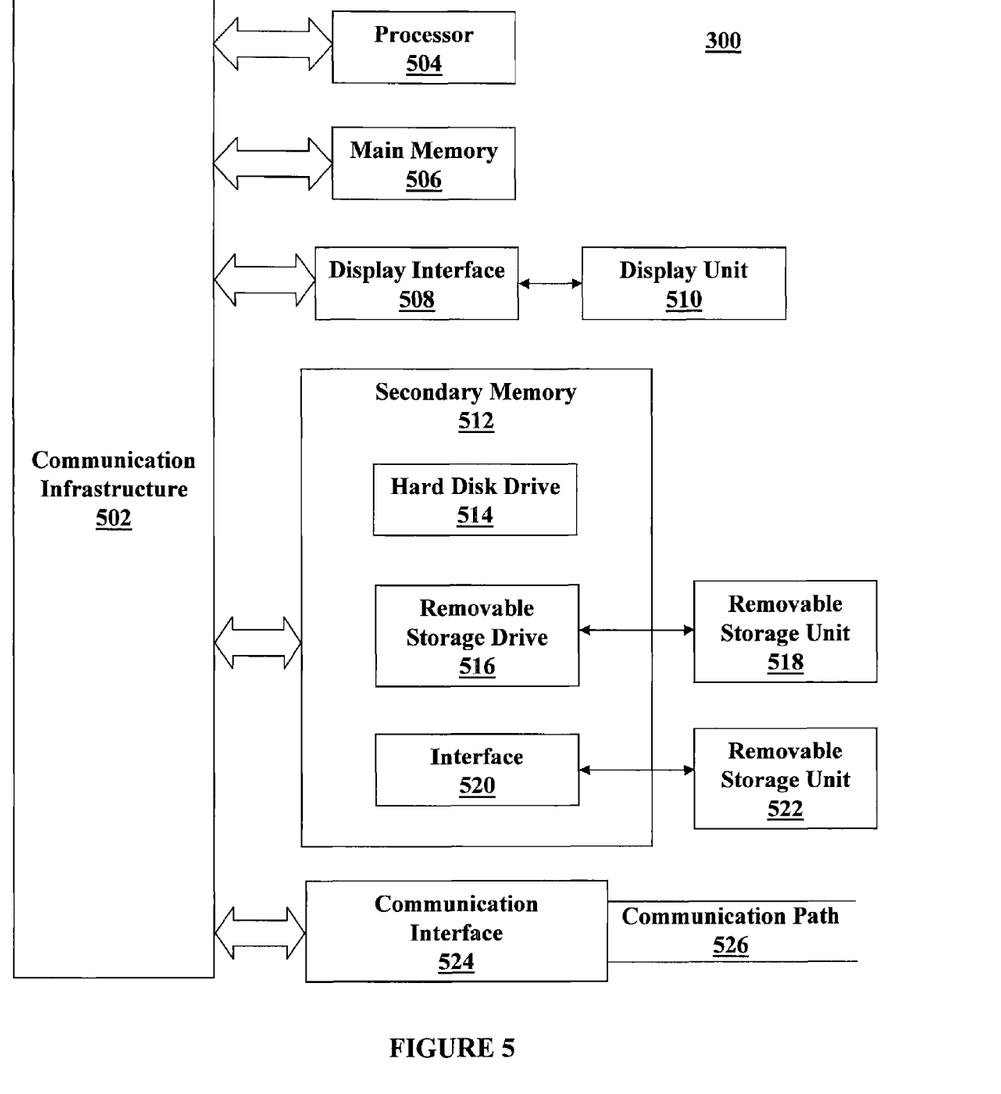
FIG. 5 is a block diagram illustrating an exemplary computer system that can be used for implementing exemplary embodiments of the present invention.

FIG. 5 is a block diagram of an exemplary computer system 500 that can be used for implementing exemplary embodiments of the present invention. Computer system 500 includes one or more processors, such as processor 504. Processor 504 is connected to a communication infrastructure 502 (for example, a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 that forwards graphics, text, and other data from the communication infrastructure 502 (or from a frame buffer not shown) for display on a display unit 510. Computer system 500 also includes a main memory 506, which can be random access memory (RAM), and may also include a secondary memory 512. Secondary memory 512 may include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a manner well known to those having ordinary skill in the art. Removable storage unit 518, represents, for example, a floppy disk, magnetic tape, optical disk, etc. which is read by and written to by removable storage drive 516. As will be appreciated, removable storage unit 518 includes a computer usable storage medium having stored therein computer software and/or data.

In exemplary embodiments, secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, a PCMCIA slot and card, etc. Software and data transferred via communications interface 524 are in the form of signals which may be, for example, electronic, electromagnetic, optical, or other signals capable of being received by communications interface 524. These signals are provided to communications interface 524 via a communications path (that is, channel) 526. Channel 526 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 506 and secondary memory 512, removable storage drive 516, a hard disk installed in hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 506 and/or secondary memory 512. Computer programs may also be received via communications interface 524. Such computer programs, when executed, can enable the computer system to perform the features of exemplary embodiments of the present invention as discussed herein. In particular, the computer programs, when executed, enable processor 504 to perform the features of computer system 500. Accordingly, such computer programs represent controllers of the computer system.

Although exemplary embodiments of the present invention have been described in detail, the present description is not intended to be exhaustive or limiting of the invention to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the present invention.

The invention claimed is:

1. A method of performing a syntactic and semantic three-way merge of structured software documents, the method comprising:

receiving a first version of a document coded in a structured programming language containing a first plurality of elements, a second version of the document containing a second plurality of elements, and a third version of the document containing a third plurality of elements, wherein the first version of a document is an original version of the document, the second version of the document is an end-user modified version of the original version and the third version of the documents is a developer modified version of the original version of the document;

deserializing the first, second, and third versions of the document to generate a first data model, a second data model, and a third data model respectively representing the first, second, and third versions in a first data store, each data model comprising a tree data structure that includes a corresponding node for each element of the plurality of elements contained within the version of the document represented by the data model, each node of each data model containing a context describing the element corresponding to the node;

generating an identifier for each node of each data model in the first data store that is unique to the node within the data model by applying a set of identifier determination rules to the context describing the element corresponding to the node;

comparing the identifier for each node in the first data model with the identifier for each node in the second data model to identify each node in the first data model not having matching identifiers with any node in the second data model in the first data store and to link each pair of nodes in the first and second data models that have matching identifiers;

applying a set of comparison rules to the contexts of each linked pair of nodes in the first and second data models to identify differences between each linked pair of nodes in the first and second data models in the first data store generating a copy of the third data model in the first data store, deleting each node in the copy of the third data model having matching identifiers with an node in the first data model not identified as having matching identifiers with any node in the second data model, and modifying each node in the copy of the third data model having matching identifiers with any linked pair of nodes in the first and second data models by applying a set of merge rules based upon the identified differences between the linked pair of nodes; and serializing the copy of the third data model to generate a fourth version of the document.

2. The method of claim 1, wherein the context of each node of each data model describes each attribute, each descendent element, and each attribute of each descendent element of the element corresponding to the node within the version of the document represented by the data model.

3. The method of claim 2, wherein the set of comparison rules applied to the contexts of each linked pair of nodes in the first and second data models includes a first comparison rule for identifying each child element of the element corresponding to the linked node in the second data model not having matching identifiers with any child element of the element corresponding to the linked node in the first data model, and wherein the set of merge rules includes a first merge rule for inserting a copy of each node corresponding to a child element of the element corresponding to the linked node in the second data model not having matching identifiers with any node corresponding to a child element of the element corresponding to the linked node in the first data model in the copy of the third data model.

4. The method of claim 2, wherein the set of comparison rules applied to the contexts of each linked pair of nodes in the first and second data models includes a first comparison rule for identifying each attribute of the element corresponding to the linked node in the second data model that does not have matching values with any corresponding attribute of the element corresponding to the linked node in the first data model, each attribute of the element corresponding to the linked node in the first data model that is not included in the element corresponding to the linked node in the second data model, and each attribute of the element corresponding to the linked node in the second data model that is not included in the element corresponding to the linked node in the first data model.

5. The method of claim 4, wherein the set of merge rules includes a first merge rule for assigning the value of each attribute of the element corresponding to the linked node in the second data model that does not have matching values with any corresponding attribute of the element corresponding to the linked node in the first data model to the corresponding attribute in the context of the node in the copy of the third data model having matching identifiers with the linked pair of nodes in the first and second data models, a second merge rule for deleting each attribute in the context of the node in the copy of the third data model having matching identifiers with the linked pair of nodes in the first and second data models corresponding to any attribute of the element corresponding to the linked node in the first data model that is not included in the element corresponding to the linked node in the second data model, and a third merge rule for inserting a copy of each attribute of the element corresponding to the linked node in the second data model that is not included in the element corresponding to the linked node in the first data model in the context of the node in the copy of the third data model having matching identifiers with the linked pair of nodes in the first and second data models.

6. The method of claim 3, wherein each version of the document is provided according to a respective set of semantic constraints specifying whether each element of the corresponding plurality of elements is ordered or unordered, and wherein comparing the identifier for each node in the first data model with the identifier for each node in the second data model further comprises comparing each node in the first data model with the identifier of each sibling node of each node in the second data model not having matching identifiers with the node in the first data model to identify whether the node in the first data model has matching identifiers with any node in the second data where the set of semantic constraints for the first version of the document specifies that the element corresponding to the node in the first data model is unordered.

7. The method of claim 6, wherein the set of comparison rules applied to the contexts of each linked pair of nodes in the first and second data models includes a second comparison rule for identifying any differences between a child element sequence of the element corresponding to the linked node in the first data model and a child element sequence of the element corresponding to the linked node in the first data model, and wherein the set of merge rules includes a second merge rule for reordering the nodes corresponding to child elements of the element corresponding to each node in the copy of the third data model having matching identifiers with any linked pair of nodes in the first and second data models where the set of semantic constraints for the first version of the document specifies that the element corresponding to the linked node in the first data model is ordered.

8. The method of claim 3, wherein the set of comparison rules applied to the contexts of each linked pair of nodes in the first and second data models includes a second comparison rule for comparing the identifier for each node corresponding to a child element of the element corresponding to the linked node in the first data model with the identifier for each node corresponding to a child element of the element corresponding to the linked node in the second data model to identify each node corresponding to a child element of the element corresponding to the linked node in the first data model not having matching identifiers with any node corresponding to a child element of the element corresponding to the linked node in the second data model in the first data store and to link each pair of nodes corresponding to child elements of the elements corresponding to the linked nodes in the first and second data models that have matching identifiers, and a third comparison rule for applying the set of comparison rules to the contexts of each linked pair of nodes corresponding to child elements of the elements corresponding to the linked nodes.

9. The method of claim 8, wherein the set of merge rules includes a second merge rule for deleting each node corresponding to a child element of the element corresponding to each node in the copy of the third data model having matching identifiers with any node in the first data model not identified as having matching identifiers with any node in the second data model, and modifying each node corresponding to a child element of the element corresponding to each node in the copy of the third data model having matching identifiers with any linked pair of nodes in the first and second data models by applying the set of merge rules based upon the identified differences between the linked pair of nodes.

10. The method of claim 1, wherein the set of identifier determination rules are maintained in a first data repository, and wherein the first data repository provides a pluggable framework for the set of identifier determination rules.

11. The method of claim 10, wherein the identifier generated for each node of each data model includes a name and zero or more attributes values of the element corresponding to node, and wherein the zero or more attribute values included in the identifier are sufficient to make the identifier unique to the node within the data model.

12. The method of claim 1, wherein the set of comparison rules are maintained in a first data repository, and wherein the first data repository provides a pluggable framework for the set of comparison rules.

13. The method of claim 1, wherein the set of merge rules are maintained in a first data repository, and wherein the first data repository provides a pluggable framework for the set of merge rules.

14. The method of claim 1, wherein the structured programming language is selected from SGML, XML, HTML, WML, XHTML, DHTML, other SGML derivatives, and user interface markup languages.

15. The method of claim 14, wherein the structured programming language is XML.

16. The method of claim 1, further comprising converting a first, second, and third versions of the document from the structured programming language to a second structured programming language.

17. The method of claim 1, wherein the fourth version of the document is generated in a second structured programming language.

18. A non-transitory computer-usable medium having computer readable instructions stored thereon for execution by a processor to perform a method of performing a syntactic and semantic three-way merge of structured software documents, the method comprising:

receiving a first version of a document coded in a structured programming language containing a first plurality of elements, a second version of the document containing a second plurality of elements, and a third version of the document containing a third plurality of elements, wherein the first version of a document is an original version of the document, the second version of the document is an end-user modified version of the original version and the third version of the documents is a developer modified version of the original version of the document;

deserializing the first, second, and third versions of the document to generate a first data model, a second data model, and a third data model respectively representing the first, second, and third versions in a first data store, each data model comprising a tree data structure that includes a corresponding node for each element of the plurality of elements contained within the version of the document represented by the data model, each node of each data model containing a context describing the element corresponding to the node;

generating an identifier for each node of each data model in the first data store that is unique to the node within the data model by applying a set of identifier determination rules to the context describing the element corresponding to the node;

comparing the identifier for each node in the first data model with the identifier for each node in the second data model to identify each node in the first data model not having matching identifiers with any node in the second data model in the first data store and to link each pair of nodes in the first and second data models that have matching identifiers; and applying a set of comparison rules to the contexts of each linked pair of nodes in the first and second data models to identify differences between each linked pair of nodes in the first and second data models in the first data store;

generating a copy of the third data model in the first data store, deleting each node in the copy of the third data model having matching identifiers with any node in the first data model not identified as having matching identifiers with any node in the second data model, and modifying each node in the copy of the third data model having matching identifiers with any linked pair of nodes in the first and second data models by applying a set of merge rules based upon the identified differences between the linked pair of nodes; and serializing the copy of the third data model to generate a fourth version of the document.

19. A data processing system comprising:

at least one processor;

a random access memory for storing data and programs for execution by the at least one processor; and computer readable instructions stored in the random access memory for execution by the at least one processor to perform a method of performing a syntactic and semantic three-way merge of structured software documents, the method comprising:

receiving a first version of a document coded in a structured programming language containing a first plurality of elements, a second version of the document containing a second plurality of elements, and a third version of the document containing a third plurality of elements, wherein the first version of a document is an original version of the document, the second version of the document is an end-user modified version of the original version and the third version of the documents is a developer modified version of the original version of the document;

deserializing the first, second, and third versions of the document to generate a first data model, a second data model, and a third data model respectively representing the first, second, and third versions in a first data store, each data model comprising a tree data structure that includes a corresponding node for each element of the plurality of elements contained within the version of the document represented by the data model, each node of each data model containing a context describing the element corresponding to the node;

generating an identifier for each node of each data model in the first data store that is unique to the node within the data model by applying a set of identifier determination rules to the context describing the element corresponding to the node;

comparing the identifier for each node in the first data model with the identifier for each node in the second data model to identify each node in the first data model not having matching identifiers with any node in the second data model in the first data store and to link each pair of nodes in the first and second data models that have matching identifiers; and applying a set of comparison rules to the contexts of each linked pair of nodes in the first and second data models to identify differences between each linked pair of nodes in the first and second data models in the first data store;

generating a copy of the third data model in the first data store, deleting each node in the copy of the third data model having matching identifiers with any node in the first data model not identified as having matching identifiers with any node in the second data model, and modifying each node in the copy of the third data model having matching identifiers with any linked pair of nodes in the first and second data models by applying a set of merge rules based upon the identified differences between the linked pair of nodes; and serializing the copy of the third data model to generate a fourth version of the document.

* * * * *